US006440316B1

(12) United States Patent
Yoon et al.

(10) Patent No.: US 6,440,316 B1
(45) Date of Patent: Aug. 27, 2002

(54) METHODS OF IMPROVING CENTRIFUGAL FILTRATION

(75) Inventors: Roe-Hoan Yoon; Ramazan Asmatulu, both of Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/531,373

(22) Filed: Mar. 21, 2000

(51) Int. Cl.[7] .............................................. B01D 17/038

(52) U.S. Cl. ....................... 210/770; 210/369; 210/771; 210/781

(58) Field of Search .............................. 210/370, 360.1, 210/368, 369, 378, 380.1, 398, 399, 770, 771, 781, 808, 406, 408, 416.1

(56) References Cited

U.S. PATENT DOCUMENTS 3,943,056 A 3/1976 Hultsch et al.
4,052,303 A 10/1977 Hultsch et al.
4,702,831 A * 10/1987 Gerteis ....................... 210/408
4,997,575 A 3/1991 Hultsch
5,092,995 A * 3/1992 Gerteis .................... 210/416.1
5,160,609 A * 11/1992 Van der Herberg ......... 210/369
5,306,423 A * 4/1994 Hultsch ...................... 210/370
5,771,601 A 6/1998 Veal et al.
5,956,858 A 9/1999 Veal et al.

* cited by examiner

*Primary Examiner*—Joseph W. Drodge
(74) *Attorney, Agent, or Firm*—Grossman, Tucker, Perreault & Pfleger, PLLC

(57) ABSTRACT

Methods of improving the efficiency of solid-liquid separation during centrifugal filtration have been developed. They consist of increasing the pressure drop across the filter cake using extraneous means such as increasing the gas pressure inside a filter chamber and/or applying vacuum on the outside. The extraneous means of increasing the pressure drop is designed to increase the rate of removing liquid (water) during the drainage period of the centrifugal filtration process and, hence, lower the amount of the residual liquid (water) left in the filter cake.

18 Claims, 1 Drawing Sheet

METHODS OF IMPROVING CENTRIFUGAL FILTRATION

BACKGROUND

Centrifugal filters are widely used for solid-liquid separation for a variety of particulate materials. In the coal and minerals industry, one type of particulate material is separated from another using various solid-solid separation methods. Since the separation is usually carried out in aqueous media, it is necessary to dewater the products before shipping to customers or downstream processes. In the coal industry, basket centrifuges are used to dewater the particles that are larger than approximately 1 mm, while finer particles are dewatered by means of screen bowl centrifuges. The latter is capable of providing considerably lower moistures than the more traditional vacuum filters, partly due to the loss of finer particles as effluent during filtration. In general, the moisture of dewatered product increases with decreasing particle size due to increased surface area. Therefore, elimination of the finest particles as effluent should help lower the dewatered product; however, it entails loss of valuables, which is not desirable.

When an aqueous suspension of particles is introduced to a batch centrifuge whose wall is made of a porous medium, the heavier solids settle quickly on the medium while the lighter water form a layer over the cake. As centrifugation continues, water begins to flow through the cake. The initial dewatering process, in which water flows through the cake while the cake is covered with a layer of water, is referred to as filtration. In time, the layer of water disappears from the surface of the cake, and the capillaries in the cake become saturated with water. The dewatering process that occurs with no water over the cake is referred to as drainage. For the reasons given below, the drainage process is much slower than the filtration process. Control of the rate of drainage is critical in controlling the final cake moisture.

The rate of drainage through the cake can be predicted by Darcy's law:

$$Q = \frac{K \Delta P A}{\mu L} \quad [1]$$

where Q is the flow rate, K the permeability of the cake, ΔP the pressure drop across the cake, A the filtration area, $\mu$ the dynamic viscosity of water, and L is the cake thickness. During the filtration period, the pressure drop across the cake is determined by the following relationship:

$$\Delta P = \frac{1}{2}\rho\omega^2(r_S^2 - r_0^2), \quad [2]$$

where ρ is the density of the liquid, ω the angular velocity, and $r_0$ and $r_s$ are the radial distances of the free water and the cake surface from the rotational axis of a centrifuge, respectively. From Eqs. [1] and [2], one can see that the rate of filtration should increase with ω and the thickness ($r_s$–$r_0$) of the water over a filter cake.

According to Eq. [2], ΔP becomes zero, when the water over the cake disappears, i.e., $r_0$=$r_s$. As the water level in the cake decreases further, i.e., $r_0$>$r_s$, the pressure within the cake becomes lower than the ambient pressure, as shown by the mathematical model developed by Zeitsch (in *Solid-*

*liquid Separation*, 3rd Edition, edited by L. Svarovsky, Buttreworth, London, 1990, p.476). The model calculations show that the pressure in the cake becomes increasingly negative with increasing cake thickness.

Despite the lack of positive pressure drop in the cake, dewatering occurs during the drainage period inasmuch as the centrifugal force within the cake exceeds the sum of the forces holding the water in the capillaries, the forces created by the negative pressure, and the forces due to hydrodynamic drag. The process of drainage relying solely on the centrifugal force entails high energy consumption and requires high maintenance to obtain low cake moistures. Energy consumption and maintenance are the major concerns in using centrifugal filters for solid-liquid separation. In the present invention, methods of overcoming these problems are disclosed. They include methods of increasing the gas pressure inside a centrifuge and/or reducing the air pressure outside. These provisions are designed to increase the pressure drop across a filter cake, so that one can take advantage of the Darcy's law (Eq. [1]), which suggests that dewatering rate should increase with increasing pressure drop. The extraneous methods of increasing the pressure drop, as disclosed in the present invention, is particularly useful for increasing the rate of dewatering during the drainage period, which is critical in achieving lower cake moistures. The methods disclosed in the present invention are useful for obtaining low cake moistures without causing high energy consumption and maintenance problems.

A series of U.S. patents (U.S. Pat. Nos. 3,943,056 and 4,052,303) awarded to Hultch disclosed a method of creating a negative pressure on the outside wall of a centrifuge and thereby increasing filtration rate. This is accomplished by creating a chamber outside the filter medium, in which filtrate water is collected. Since the water in this chamber is subjected to a larger centrifugal force that that remaining in the cake, a negative (or vacuum) pressure is created due to a siphon effect. This technique is, therefore, referred to as the method of using rotating siphon. However, the effectiveness of this method breaks down as soon as air enters the filtrate chamber through the filter cake. This will not allow a sufficiently long drainage period, which is often necessary for producing low cake moistures.

The U.S. Pat. No. 4,997,575 teaches a method of using rotating siphons in a pressure housing with superatmospheric pressure, which is controlled by a difference in filtrate liquid levels in the filtrate liquid chamber and the annular space following the filter. This liquid control prevents the penetration of filtrate liquid into the gas exhaust line.

The U.S. Pat. Nos. 5,771,601 and 5,956,854 teach a method of injecting a gas stream such as air into the bed of particles during centrifugation and thereby reducing the surface moisture of the particles. The turbulent flow created by the gas flow strips the water from the surface of the particles. This technique is useful for the particles in the range of 0.5 to 30 mm that are dewatered in basket centrifuges. In this invention, the stream of gas is injected into an open space. Therefore, it cannot significantly increase the pressure drop across the bed of particles. Also, it would be difficult to increase the pressure drop, when a cake is continually disturbed by a scrawl, which is widely used to move the particles in basket centrifuges. Furthermore, the airflow is created by a blower rather than a compressor, which should make it difficult to create a high pressure drop across a filter cake.

SUMMARY OF THE INVENTION

According to the theoretical considerations given above, the rate of dewatering is low during the drainage period of a centrifugal filtration process, which in turn can be attributed to the lack of positive pressure drop across filter cake. This problem can be overcome by increasing the pressure drop using extraneous means such increasing the gas pressure inside a centrifugal filter and/or reducing the pressure of the gas (air) outside. It has been found that these provisions greatly enhance the rate of drainage and, thereby, lower the cake moistures.

In effect, the present invention suggests methods of combining the conventional centrifugal filtration with pressure and/or vacuum filtration. However, the moisture reductions that can be achieved using the combined method are substantially lower than the sum of the moisture reductions achieved using the different dewatering methods individually. Thus, the combined method exhibits synergism. Although the increase in drainage rate induced by the extraneous means of increasing the pressure drop can provide an explanation for the observed improvement, there may be other mechanisms that are responsible for the synergism.

In a typical operation, a slurry is introduced to a basket-type centrifuge whose side wall is made of a porous medium (e.g., screen, sintered glass, sintered ceramic, sintered metal, or filter cloth laid over screen). The top and bottom of the centrifuge is made of solid material(s) so that the air introduced into the centrifugal filter vessel can exit only through the porous side wall. The centrifuge can be positioned vertically, horizontally, upside down, or with any angle, as the gravitational force is insignificantly small as compared to the centrifugal force. The feed slurry can be introduced either as dilute suspension or thickened slurry.

The centrifuge can be operated either as a batch or continuous solid-liquid separation unit. In a batch operation, the particles in the slurry quickly form a cake over the porous medium and the liquid (water) passes through the cake. The rate of the water flowing through the cake is high when the cake is covered by a layer of water, as the pressure drop across the cake is positive in accordance with Eq. [2]. As the water layer disappears from the cake surface, i.e., $r_s=r_0$, the pressure drop becomes zero, which will cause a decrease in drainage rate. The water will continue to flow through the cake under these conditions inasmuch as the centrifugal force in the cake exceeds the sum of the capillary force that holds the water on the capillary wall and the hydrodynamic drag force. The provisions of the present invention, i.e., increase in the pressure drop by the extraneous means, can increase the rate of drainage and, hence, lower the cake moisture.

In one embodiment of the present invention, the pressure inside a centrifugal filter vessel is increased by introducing a stream of compressed air. This will increase the pressure drop across the filter cake and, hence, the rates of both filtration and drainage. The real advantage of using the compressed air is found during the drainage period. As has already been noted, the pressure inside a cake becomes zero or negative depending on the cake thickness and angular velocity. The applied air pressure will provide a net positive pressure drop, which should greatly increase the rate of drainage and lower the final cake moisture.

Another embodiment of the present invention is to increase the pressure drop across filter cake by applying a vacuum pressure on the outside wall of the centrifugal filter described above.

Still another embodiment of the present invention is to apply compressed air inside a centrifugal filter vessel and at the same time apply a vacuum on the outside. However, this method may be reserved only for the cases of dewatering materials that are very difficult to treat. The method of using either compressed air or vacuum pressure alone may be sufficient for dewatering many coal and mineral fines, as will be shown in the examples given in this invention disclosure.

Yet another embodiment of the present invention is to increase the hydrophobicity of particulate materials to increase the rate of drainage during centrifugal dewatering. According to the Laplace equation, an increase in hydrophobicity should result in a decrease in capillary pressure, which should help increase the drainage rate. This is particularly important for difficult-to-dewater materials such as precipitated calcium carbonate (PCC).

The method of increasing the pressure drop across the cake using the extraneous methods as described in the present invention has advantages over the method of using the rotating siphons in that the increased pressure drop persists during the entire drainage period. On the contrary, the method of using rotating siphons stops working as soon as the air passes through the cake. It is generally regarded that a filter cake consists of capillaries of different radii. The water in larger capillaries are more readily removed than that in smaller capillaries. Therefore, air can pass through a cake very quickly through the large capillaries and nullify the pressure drop created by the rotating siphons. This will make it difficult to remove the water in smaller capillaries. On the other hand, the method of applying air pressure or vacuum pressure as disclosed in the present invention is effective during the entire period of drainage period employed. This will give opportunities for the water trapped in smaller capillaries to be removed, which will result in low cake moistures.

BRIEF DESCRIPTION OF THE DRAWINGS

The new concept and its embodiment may be better described using the drawings of the laboratory-scale centrifugal filters used in the present invention.

DETAILED DESCRIPTION OF THE PREFERRED EMBODIMENTS

Embodiment of the present invention may be best depicted by describing the detailed procedures of the laboratory experiments. The test work was conducted using coal and mineral slurries received from operating mines. Prior to conducting a series of dewatering experiments, a given slurry was filtered by gravity using a large separatory funnel. This procedure is similar to the process of thickening, which occurs in the pool section of a screen bowl centrifuge. The thickened slurries, which contained 40 to 45% moisture for the case of coal fines and 20 to 72% for the case of mineral fines and pigments, were used as the feeds to the laboratory centrifugal filtration tests.

Figure 1:
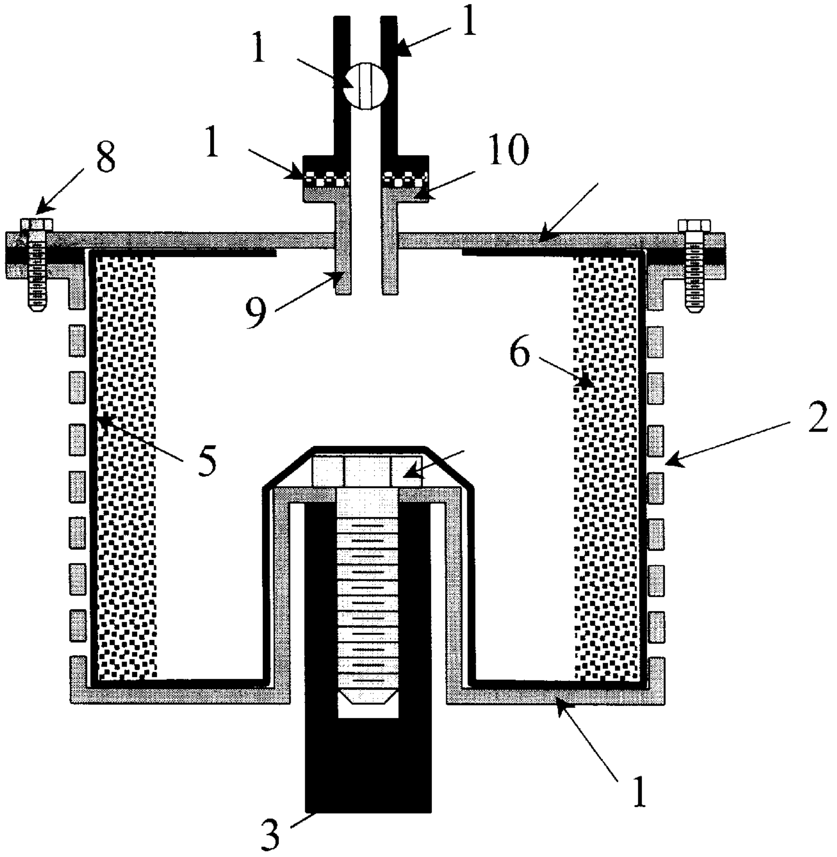
FIG. 1 is a schematic representation of the centrifugal filter vessel, which was used for batch dewatering tests under conditions of applied air pressure.

FIG. 1 shows the centrifugal filtration vessel 1 that was used for conducting filtration tests under conditions of applied air pressure. It was made of stainless steel with dimensions of 3.4 inches in inside diameter and 3 inches in height. It was placed vertically inside a centrifuge machine, which was capable of varying the r.p.m. of the vessel. The side wall was made of perforated stainless steel with ⅛, 3/32 and 1/16 inch circular holes 2. The filter vessel was tightened against the rotor 3 of the centrifuge by means of a screw 4. A filter cloth 5, which was designed to fit the contour of the centrifuge vessel 1, was placed inside. A thickened slurry was then pasted against the filter cloth 5 and the side wall of the filter vessel to form a cake 6. The filter vessel was then covered by a lid 7, which was tightened against the filter vessel 1 by means of screws 8. At the center of the cover lid 7, a compressed air inlet tubing 9 was connected. This tubing was terminated by a flat-polished surface 10. A double-bearing connector 11 was used to couple the compressed air inlet tubing 9 with an external compressed air line 12, which was equipped with an on/off valve 13. Although not shown in FIG. 1, an air flow meter and a pressure gauge were also installed on the compressed air line 12.

Figure 2:
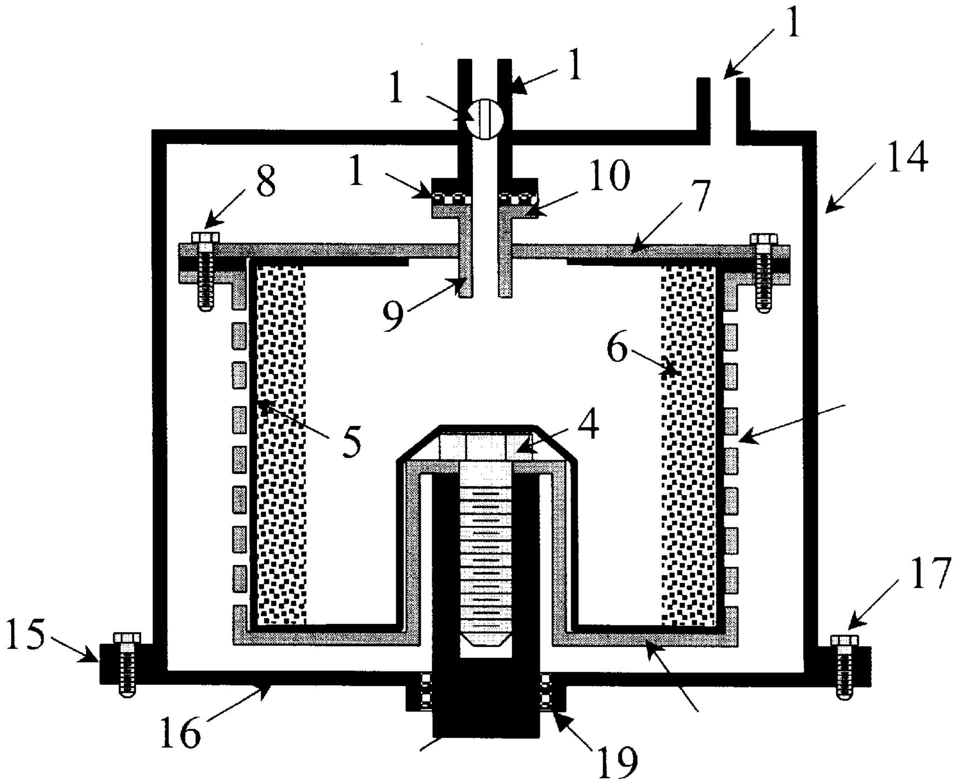
FIG. 2 is a schematic representation of the centrifugal filter, which was used for batch filtration tests under conditions of applied air pressure and/or vacuum.

FIG. 2 shows the apparatus that was used for the filtration tests conducted under conditions of applying compressed air and/or vacuum pressure. The centrifugal filter vessel 1 used in these experiments was the same as shown and described in FIG. 1. After pasting a thickened slurry against the filter medium in the manner described in conjunction with FIG. 1, a vacuum chamber 14 was placed over the centrifugal filter vessel 1. The chamber 14 was sealed form the ambient by means of a rubber gasket 15 and a bottom plate 16, which was tightened against the vacuum chamber 14 using screws 17. The vacuum chamber was connected to a vacuum pump through a tubing 18 and sealed against the rotor 3 by means of a ball-bearing seal 19.

The centrifugal dewatering tests were conducted by varying the centrifugal force, air pressure, vacuum pressure, cake thickness, spin (or centrifugation) time. The centrifugal force was varied by changing the rotational speed (or angular velocity, ω)of the filter vessel, which can be related to the gravitational acceleration, g, using the following relationship:

$$G = \frac{r\omega^2}{g}, \qquad [3]$$

in which r is the radius of the centrifugal dewatering vessel. The cake thickness was measured after each experiment. The cake was then removed from the filter vessel, weighed, dried in a convention oven at 105° C. for overnight, and then weighed again to determine the residual moisture left in the cake.

EXAMPLE 1

A mixture of spiral concentrate and a flotation product was received as wet slurry in a 5-gallon bucket. It was received from a plant where a Pittsburgh seam coal was being cleaned. A representative portion of the slurry was removed and filtered on a coarse filter paper by gravity. The thickened sample, which contained 35.9% moisture, was pasted against the filter cloth placed in inside the laboratory centrifugal filter shown in FIG. 1. The thickness of the filter cake, as measured after centrifugation, was 0.7 inches. The tests were conducted at different rotational speeds, spin times, and air pressures.

Table 1 shows the results obtained with the Pittsburgh seam coal at 2,000 G. In general, cake moisture decreased with increasing spin time. In control experiments, in which no air pressure was applied, the moisture was reduced from 35.9 to 21.0% after 150 seconds of spin time. When the centrifugal filtration experiments were conducted in the presence of applied air pressures, the moisture was further reduced. At 100, 200 and 300 kPa of air pressures and at 150 seconds of spin time, the take moistures were reduced to 12.1, 9.9 and 9.3%, respectively.

TABLE 1

The Results Obtained with a Pittsburgh Coal Sample Using Different Air Pressures at 2000 G

| Spin Time | Cake Moisture (% wt) | | | |
|---|---|---|---|---|
| | | Air Pressure (kPa) | | |
| (sec) | None | 100 | 200 | 300 |
| 0 | 35.9 | 35.9 | 35.9 | 35.9 |
| 30 | 22.5 | 15.3 | 14.2 | 13.5 |
| 60 | 21.3 | 13.9 | 12.5 | 11.3 |
| 90 | 21.1 | 13.2 | 11.5 | 10.4 |
| 120 | 21.0 | 12.4 | 10.6 | 9.5 |
| 150 | 20.6 | 12.1 | 9.9 | 9.3 |

EXAMPLE 2

In this example the Pittsburgh coal sample used in Example 1 was screened at 200 mesh and the −0.074 mm×0 fraction was used for centrifugal filtration experiments. Table 2 shows the results obtained by changing air pressure and spin time at 2,000 G and 0.5-inch cake thickness. The moisture reductions achieved in control experiments were poor due to the fine particle size. After 30 seconds of spin time, the moisture was reduced from 42.3 to 37.1% after 30 seconds of spin time. The moisture reduction did not improve significantly after longer spin times. When air pressure was applied, however, the cake moisture was further reduced. The extent of moisture reduction achieved by the application of compressed air increased with increasing air pressure and spin time. At 400 kPa of air pressure and 150 second spin time, the cake moisture was reduced to as low as 16.8%.

TABLE 2

The Results Obtained with a Fine (−0.074 mm) Pittsburgh Coal Sample at 2,000 G and 0.5-inch Cake Thickness

| Spin Time (sec) | Cake Moisture (% wt) | | | | |
|---|---|---|---|---|---|
| | | Air Pressure (kPa) | | | |
| | None | 100 | 200 | 300 | 400 |
| 0 | 42.3 | 42.3 | 42.3 | 42.3 | 42.3 |
| 30 | 37.1 | 31.9 | 27.6 | 24.5 | 22.5 |
| 60 | 36.9 | 31.2 | 24.6 | 21.2 | 19.7 |
| 90 | 36.7 | 30.2 | 23.8 | 20.2 | 18.4 |
| 120 | 36.6 | 29.7 | 23.0 | 19.1 | 17.8 |
| 150 | 36.5 | 28.5 | 22.5 | 18.8 | 16.8 |

EXAMPLE 3

A flotation product obtained from the Microcel™ flotation columns at Middle Fork coal preparation plant, Virginia, was screened at 400 mesh to remove particles finer than 0.038 mm, and the −0.3+0.038 mm fraction was subjected to the centrifugal filtration tests at 2,500 G and 0.5-inch cake thickness. The test results obtained by varying air pressure and spin time are given in Table 3. In control tests, the moisture was reduced from 41.1 to 25.0% after 150 seconds of spin time. The cake moisture obtained after 30 seconds of spin time was 27.5%. Thus, the centrifugal filtration without air pressure is not effective in reducing the residual cake moisture even after desliming. When using compressed air, however, the cake moistures were reduced to below 10%. At 150 seconds of spin time and 250 kPa of air pressure, the moisture was reduced to as low as 3.9%.

TABLE 3

The Results Obtained with a Deslimed Microcel ™ Flotation Product at 2,500 G and Varying Air Pressures

| Spin Time (sec) | Cake Moisture (% wt) | | | |
|---|---|---|---|---|
| | | Air Pressure (kPa) | | |
| | None | 50 | 150 | 250 |
| 0 | 41.1 | 41.1 | 41.1 | 41.1 |
| 30 | 27.5 | 12.2 | 10.0 | 9.1 |
| 60 | 26.2 | 10.9 | 8.0 | 7.1 |
| 90 | 25.9 | 8.9 | 7.1 | 6.1 |
| 120 | 25.4 | 8.0 | 6.3 | 4.6 |
| 150 | 25.0 | 7.6 | 6.0 | 3.9 |

EXAMPLE 4

A sphalerite concentrate obtained by flotation was tested for the centrifugal filtration technique disclosed in the present invention. It was a sphalerite concentrate (0.15 mm×0) obtained from an operating mineral processing plant. The sample was thickened to 20.3% moisture prior to centrifugal filtration tests at 2000 G and 0.62 inch cake thickness. The results, given in Table 4, show that the cake moisture was reduced to 3.3% at 300 kPa air pressure and 120 sec spin time. At 30 seconds of spin time and 100 kPa air pressure, the moisture was reduced to 7.2% which may be sufficient for practical purpose.

TABLE 4

The Results Obtained with a Sphalerite Concentrate at 2000 G and 0.62-inch Cake Thickness

| Spin Time (sec) | Cake Moisture (% wt) | | | | |
|---|---|---|---|---|---|
| | | Air Pressure (kPa) | | | |
| | None | 50 | 100 | 200 | 300 |
| 0 | 20.3 | 20.3 | 20.3 | 20.3 | 20.3 |
| 30 | 13.2 | 8.4 | 7.2 | 5.8 | 5.0 |
| 60 | 13.1 | 8.1 | 6.5 | 4.7 | 4.2 |
| 90 | 12.8 | 7.2 | 6.1 | 4.5 | 3.5 |
| 120 | 12.4 | 7.1 | 5.9 | 4.2 | 3.3 |

EXAMPLE 5

Table 5 shows the results of the centrifugal filtration tests conducted on a chalcopyrite concentrate (0.15 mm×0) received from an operating plant. The tests were conducted at 2000 G and 0.7-inch cake thickness. The tests conducted without air pressure reduced the cake moisture from 22.9 to 14.1% after 90 seconds of centrifugation. Longer spin times did not significantly reduce the moisture further. In the presence of applied air pressures, however, very low cake moistures were obtained. At 100 kPa air pressure, the moisture was reduced to 6.9% after only 30 seconds of spin time.

TABLE 5

The Results Obtained with a Chalcopyrite Concentrate at 2000 G and 0.7-inches Cake Thickness

| Spin Time (sec) | Cake Moisture (% wt) | | | | |
|---|---|---|---|---|---|
| | | Air Pressure (kPa) | | | |
| | None | 50 | 100 | 200 | 300 |
| 0 | 22.9 | 22.9 | 22.9 | 22.9 | 22.9 |
| 30 | 15.1 | 9.5 | 6.9 | 6.1 | 6.0 |
| 60 | 14.5 | 9.0 | 5.8 | 5.1 | 4.9 |
| 90 | 14.1 | 8.4 | 5.7 | 4.6 | 4.1 |
| 120 | 14.0 | 8.0 | 5.5 | 4.0 | 3.1 |
| 150 | 13.9 | 7.8 | 5.1 | 3.6 | 2.5 |

EXAMPLE 6

One of the most difficult materials to dewater is the fine kaolin clay from east Georgia (95% lower than 2 microns). The sample was dewatered to 62% moisture by thickening in the presence of 300 g/ton of Super Floc 214, and then subjected to centrifugal filtration experiments at 2000 G and 0.4-inch cake thickness. The results are given in Table 6. In the absence of air pressure, the moisture was reduced to 47.9% after 210 seconds of spin time. At 600 kPa air pressure and 210 seconds of spin time, the cake moisture was reduced to 25.7%. Although the pressure is high air flow rate was only 2 scfm. Such low moisture should obviate the need for spray drying, which is costly.

TABLE 6

Results Obtained on an East Georgia Kaolin Clay at 2000 G and 0.4-inch Cake Thickness

| Spin Time | Cake Moisture (% wt) | | | | |
|---|---|---|---|---|---|
| | | Air Pressure (kPa) | | | |
| (sec) | None | 150 | 300 | 450 | 600 |
| 0 | 62.0 | 62.0 | 62.0 | 62.0 | 62.0 |
| 30 | 52.1 | 43.2 | 40.8 | 38.5 | 34.6 |
| 90 | 50.3 | 39.1 | 35.6 | 34.4 | 31.3 |
| 150 | 48.4 | 35.4 | 32.5 | 30.1 | 28.9 |
| 210 | 47.9 | 33.6 | 30.1 | 27.6 | 25.7 |

EXAMPLE 7

Precipitated calcium carbonate (PCC) is another material that is very difficult to dewater. In this example, a PCC sample of −2 μm was used for centrifugal filtration tests. The pH was adjusted to 9.5 by lime addition before adding a small amount (500 g/ton) of sodium oleate to render the surface hydrophobic, which should help dewatering. The slurry was thickened to 70.3% moisture before the filtration experiments. The tests were conducted at 2000 G and 0.35-inches cake thickness. As shown in Table 7, the cake moisture was reduced to 57.8% after 3 minutes of spin time. At 600 kPa air pressure, the moisture was further reduced to 34.2%, which represented approximately 52% reduction in moisture. It was found that cake breakage occurred during filtration under air pressure. If a method is found to prevent the breakage problem, which is caused by cake shrinkage, the cake moisture could be further reduced.

TABLE 7

The Results Obtained on a PCC Sample at 2000 G and 0.35-inch Cake Thickness

| Spin Time | Cake Moisture (% wt) | | | | |
|---|---|---|---|---|---|
| | None | Air Pressure (kPa) | | | |
| (sec) | Air | 150 | 300 | 450 | 600 |
| 0 | 70.3 | 70.3 | 70.3 | 70.3 | 70.3 |
| 30 | 62.1 | 51.2 | 46.7 | 41.6 | 37.9 |
| 60 | 60.6 | 49.3 | 43.6 | 38.5 | 36.3 |
| 120 | 58.3 | 47.3 | 41.1 | 36.9 | 35.1 |
| 180 | 57.8 | 46.7 | 40.0 | 35.5 | 34.2 |

EXAMPLE 8

A phosphate ore (−0.42+0.038 mm) from Florida was floated using a tall oil fatty acid as collector and fuel oil as extender at a neutral pH. The concentrate was subjected to centrifugal filtration tests. One set of tests was conducted using compressed air using the apparatus shown in FIG. 1, while another set of tests was conducted under vacuum pressure using the apparatus shown in FIG. 2. The results are given in Table 8. In control tests, cake moisture was reduced from 40.4 to 17.2% after two minutes of spin time. At −80 kPa of vacuum pressure and 80 kPa of air pressure, the moistures were reduced to 9.3 and 8.8%, respectively. The difference between the two sets of data are small, indicating that what is needed to improve the performance of centrifugal filtration is the pressure drop (ΔP) across the cake, regardless of whether it is boosted by compressed air inside the filter vessel or vacuum pressure on the outside.

TABLE 8

Comparison of Using Vacuum and Air Pressures on the Centrifugal Filtration of a Phosphate Sample at 2000 G

| Spin Time | Cake Moisture (% wt) | | | | |
|---|---|---|---|---|---|
| | | Vacuum Pressure (kPa) | | Air Pressure (kPa) | |
| (sec) | None | −40 | −80 | 40 | 80 |
| 0 | 40.4 | 40.4 | 40.4 | 40.4 | 40.4 |
| 30 | 19.7 | 14.1 | 12.3 | 13.3 | 12.6 |
| 60 | 18.2 | 12.6 | 10.2 | 12.9 | 10.3 |
| 90 | 17.9 | 12.2 | 9.6 | 11.9 | 9.5 |
| 120 | 17.2 | 11.8 | 9.3 | 11.6 | 8.8 |

EXAMPLE 9

A −0.6 mm×0 Pittsburgh coal sample was floated using 1 lb/ton kerosene and 100 g/ton MIBC. The froth product was subjected to centrifugal filtration tests at 2,000 G and 0.45-inch cake thickness. The tests were conducted with and without a dewatering aid (2 lb/ton Span 80) dissolved in 4 parts of diesel oil. The results are given in Table 9. As shown, the use of the low HLB surfactant further reduced the cake moisture beyond what can be achieved form centrifugal filtration in the presence of the air pressure.

TABLE 9

Effects of Using a Dewatering Aid on the Centrifugal Filtration of a Pittsburgh Coal at Different Air Pressures

| | Moisture (% wt) | | | | | |
|---|---|---|---|---|---|---|
| | 50 kPa | | 100 kPa | | 200 kPa | |
| Spin Time (seconds) | No Reagent | Span 80 2 lb/ton | No Reagent | Span 80 2 lb/ton | No Reagent | Span 80 2 lb/ton |
| 0 | 36.5 | 36.5 | 36.5 | 36.5 | 36.5 | 36.5 |
| 30 | 18.3 | 14.9 | 14.2 | 11.1 | 13.2 | 10.1 |
| 60 | 16.3 | 13.6 | 12.9 | 10.5 | 10.6 | 8.2 |
| 120 | 15.1 | 12.8 | 10.6 | 8.6 | 9.1 | 7.3 |

EXAMPLE 10

A −28 mesh×0 Pittsburgh coal sample was subjected to a series of i) pressure filtration test at 100 kPa of air pressure, ii) centrifugal filtration tests at 2,000 G, iii) and centrifugal filtration tests at 100 kPa of air pressure. The results obtained at different dewatering or centrifugation times are given in Table 10 for comparison. The results obtained with a combination of high G and air pressure gave significantly better results than with air pressure alone or centrifugal force. The improvements obtained using the combination are far superior to those obtained using either air pressure or G-force alone, demonstrating a synergistic effect.

TABLE 10

Synergistic Effects of Using Centrifugal Force and Compressed Air for the Dewatering of a Pittsburgh Coal[3]

| Drying Cycle or Centrifugation Time (sec) | Cake Moisture (wt %) Air Pressure[1] Alone | Centrifugal Force[2] Alone | Centrifugal Force[2] & Air Pressur[1] |
|---|---|---|---|
| 30 | 27.5 | 24.4 | 14.2 |
| 60 | 25.8 | 22.6 | 12.9 |
| 120 | 23.8 | 21.0 | 10.6 |

[1]100 kPa of air pressure;
[2]2000 G;
[3]0.45 inch cake thickness.

EXAMPLE 11

In this example, the synergistic effect of using a combination of air pressure and G-force in filtration is demonstrated with a −100 mesh talc sample. The tests were conducted at a 0.46-inch cake thickness by varying drying cycle time or spin time. As has been the case with the coal sample, the use of air pressure during centrifugal filtration demonstrated synergistic improvement in dewatering fine particles.

TABLE 11

Synergistic Effects of Using Centrifugal Force and Compressed Air for the Dewatering of a Talc Sample[3]

| Drying Cycle or Spin Time (sec) | Cake Moisture (wt %) Air Pressure Alone (kPa) 100 | 200 | Centrifugal Force Alone 1000 G | 2000 G | Air Pressure and Centrifugal Force 100[1] & 1000 G[2] | 200[1] & 2000 G[2] |
|---|---|---|---|---|---|---|
| 30 | 30.2 | 25.7 | 26.0 | 25.1 | 19.1 | 15.4 |
| 60 | 27.2 | 22.3 | 25.8 | 24.8 | 16.8 | 13.2 |
| 120 | 25.8 | 21.9 | 25.5 | 24.6 | 15.2 | 11.6 |

[1]Air pressure in kPa;
[2]G-Force;
[3]0.46 inch cake thickness.

EXAMPLE 12

In this example, centrifugal filtration tests were conducted using both compressed air inside a filter vessel and vacuum on the outside (FIG. 2). The tests were conducted on a phosphate concentrate (−0.42+0.038 mm), obtained by flotation using Tall oil and fuel oil at a neutral pH. The ore sample came from Florida, and the test results are given in Table 12. In this table, the positive pressures refer to air pressure, and the negative numbers refer to vacuum pressures.

TABLE 12

Results Obtained on a Phosphate Concentrate Using Both Compress Air and Vacuum Pressure at 2000 G[1]

| Spin Time (sec) | Cake Moisture (% wt) Air & Vacuum Pressures (kPa) None | 40 & −40 | 80 & −80 |
|---|---|---|---|
| 0 | 40.4 | 40.4 | 40.4 |
| 30 | 19.7 | 11.9 | 8.7 |
| 60 | 18.2 | 10.2 | 7.3 |
| 90 | 17.9 | 9.5 | 7.6 |
| 120 | 17.2 | 9.0 | 6.4 |

[1]0.45 inches cake thickness

As shown, a combination of air and vacuum pressures gave excellent results, which demonstrates that what is needed is an increased pressure drop across the cake. It does not seem to matter whether the increase is brought about by air pressure, vacuum pressure, or combination of the two.

We claim:

1. A method of performing solid-liquid separation during centrifugal filtration comprising:

feeding a slurry into a filtration chamber, the slurry comprising at least a particulate component and a liquid component;

rotating the filtration chamber to apply a centrifugal force to at least a portion of the slurry, whereby the particulate component forms a cake on a porous member;

allowing the liquid to migrate through an interior surface of the cake, until the liquid is substantially removed from the interior surface of the cake; and providing a compressed gas to the filtration chamber, whereby a positive pressure gradient is produced across a thickness of the cake for removing the liquid from an interior of the cake.

2. The method according to claim 1 wherein the centrifugal force is in the range of between about 50–5,000 times gravitational acceleration.

3. The method according to claim 1 wherein the compressed gas comprises compressed air.

4. The method according to claim 1 wherein feeding the slurry into the filtration chamber is performed in one of: batch wise, intermittently, and continuously.

5. The method according to claim 1 wherein the compressed gas is provided in one of: pulses, intermittently, and continuously.

6. A method of performing solid-liquid separation during centrifugal filtration comprising:

enclosing at least a portion of a filtration chamber in a vacuum chamber, wherein the filtration chamber is in communication with an exterior atmosphere;

feeding a slurry into a filtration chamber, the slurry comprising at least a particulate component and a liquid component;

rotating the filtration chamber to apply a centrifugal force to at least a portion of the slurry, whereby the particulate component forms a cake on a porous member;

allowing the liquid to migrate through an interior surface of the cake, until the liquid is substantially removed from the interior surface of the cake; and evacuating the vacuum chamber, whereby a positive pressure gradient is produced across a thickness of the cake for removing liquid from an interior of the cake.

7. The method according to claim 6 wherein rotating the filtration chamber further comprises rotating the vacuum chamber.

8. The method according to claim 6 wherein the centrifugal force is in the range of between about 50–5,000 times gravitational acceleration.

9. The method according to claim 6 wherein the exterior atmosphere is drawn through the cake.

10. The method according to claim 6 wherein feeding the slurry into the filtration chamber is performed in one of: batch wise, intermittently, and continuously.

11. The method according to claim 6 wherein enclosing the filtration chamber in a vacuum chamber comprises disposing a vacuum chamber around an exterior wall of the filtration chamber.

12. The method according to claim 6 wherein the vacuum chamber is evacuated in one of pulses, intermittently, and continuously.

13. A method of performing solid-liquid separation during centrifugal filtration comprising:

enclosing a filtration chamber in a vacuum chamber, wherein the filtration chamber is in communication with an exterior atmosphere;

feeding a slurry into a filtration chamber, the slurry comprising at least a particulate component and a liquid component;

rotating the filtration chamber to apply a centrifugal force to at least a portion of the slurry, whereby the particulate component forms a cake on a porous member;

allowing the liquid to migrate through an interior surface of the cake, until the liquid is substantially removed from the interior surface of the cake;

providing a compressed gas to the filtration chamber; and evacuating the vacuum chamber, whereby a positive pressure gradient is produced across a thickness of the cake for removing the liquid from an interior of the cake.

14. The method according to claim 13 wherein the centrifugal force is in the range of between about 50–5,000 times gravitational acceleration.

15. The method according to claim 13 wherein the compressed gas comprises compressed air.

16. The method according to claim 13 wherein feeding the slurry into the filtration chamber is performed in one of: batch wise, intermittently, and continuously.

17. The method according to claim 13 wherein the compressed air is provided in one of: pulses, intermittently, and continuously.

18. The method according to claim 13 wherein the vacuum chamber is evacuated in one of pulses, intermittently, and continuously.

* * * * *

UNITED STATES PATENT AND TRADEMARK OFFICE

CERTIFICATE OF CORRECTION

PATENT NO. : 6,440,316 B1
DATED : August 27, 2002
INVENTOR(S) : Yoon et al.

It is certified that error appears in the above-identified patent and that said Letters Patent is hereby corrected as shown below:

Column 1,
Line 3, between the Title and the “BACKGROUND” insert the following:
-- STATEMENT REGARDING FEDERALLY SPONSORED RESEARCH OR DEVELOPMENT
The U.S. Government has a paid-up license in this invention and the right in limited circumstances to require the patent owner to license others on reasonable terms as provided for by the terms of contract number DE-AC26-98FT40153 awarded by the U.S. Department of Energy. --

Signed and Sealed this

Fifth Day of July, 2005

JON W. DUDAS
*Director of the United States Patent and Trademark Office*